United States Patent [19]

Berkowitz et al.

[11] 4,121,964
[45] Oct. 24, 1978

[54] APPARATUS AND METHODS FOR FABRICATION OF MAGNETIC PRINTING BELT

[75] Inventors: Ami E. Berkowitz, Schenectady; John O. Fielding, Ballston Lake, both of N.Y.; Joseph A. Lahut, Waynesboro, Va.

[73] Assignee: General Electric Company, Schenectady, N.Y.

[21] Appl. No.: 823,384

[22] Filed: Aug. 10, 1977

[51] Int. Cl.² .................. G03D 15/04; B29C 27/08
[52] U.S. Cl. ............................. 156/507; 156/580.2
[58] Field of Search ............. 156/73.1, 267, 580.2, 156/258, 73.4, 159, 507, 508; 228/1 R; 269/23

[56] References Cited

U.S. PATENT DOCUMENTS

| | | | |
|---|---|---|---|
| 962,381 | 6/1910 | Nickerson et al. | 156/507 |
| 3,243,487 | 3/1966 | Smith | 156/269 |
| 3,418,185 | 12/1968 | Balamuth et al. | 156/73.4 |
| 3,508,989 | 4/1970 | Lawrence et al. | 156/73.1 |
| 3,577,292 | 5/1971 | Obeda | 156/73.1 |
| 3,589,959 | 6/1971 | Sander et al. | 156/159 |
| 3,687,787 | 8/1972 | Grand | 156/507 |

*Primary Examiner*—Douglas J. Drummond
*Attorney, Agent, or Firm*—Geoffrey H. Krauss; Joseph T. Cohen; Marvin Snyder

[57] ABSTRACT

Apparatus for fabricating a continuous loop of magnetic belt material, for use as a recording medium in a magnetic printer, utilizes a pair of cylindrical members spaced essentially parallel to one another, over which magnetic tape is layed, and held thereon by means of vacuum hold-down devices, while a seam is precisely cut and ultrasonically bonded. Methods for carrying out the fabrication are disclosed.

6 Claims, 11 Drawing Figures

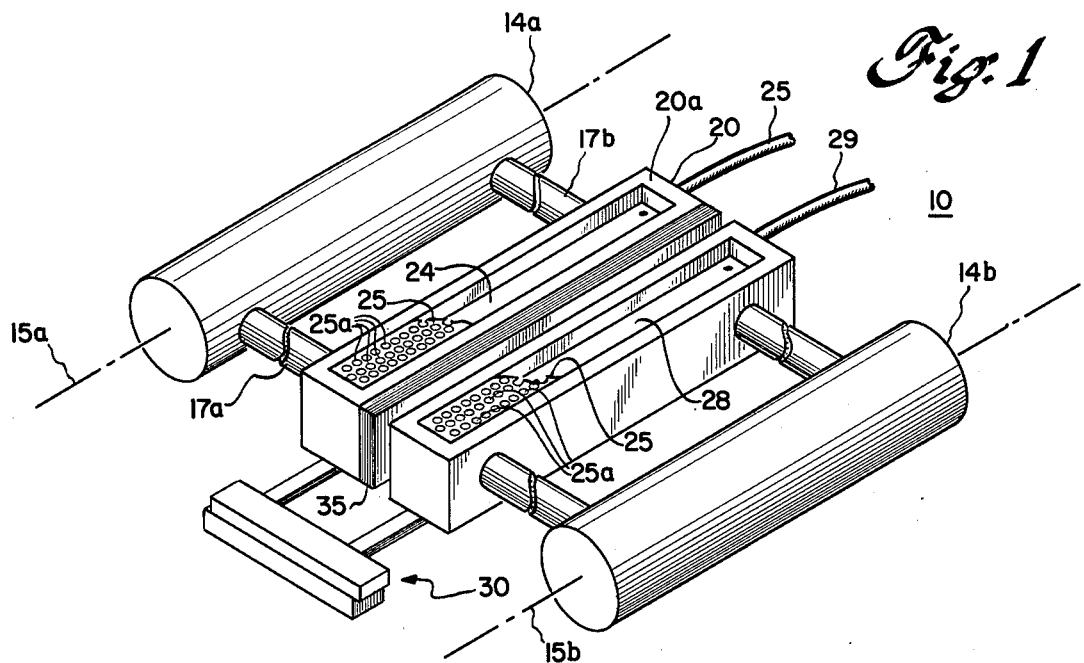
Fig. 1
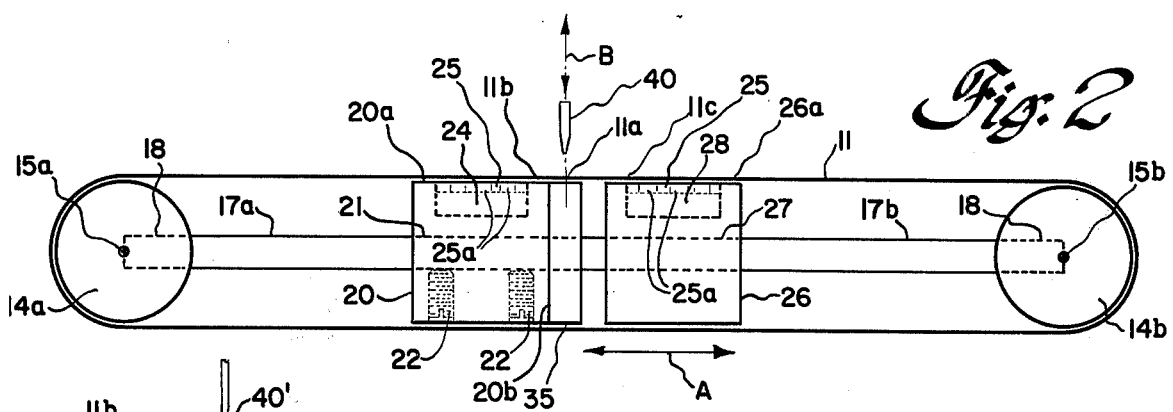
Fig. 2
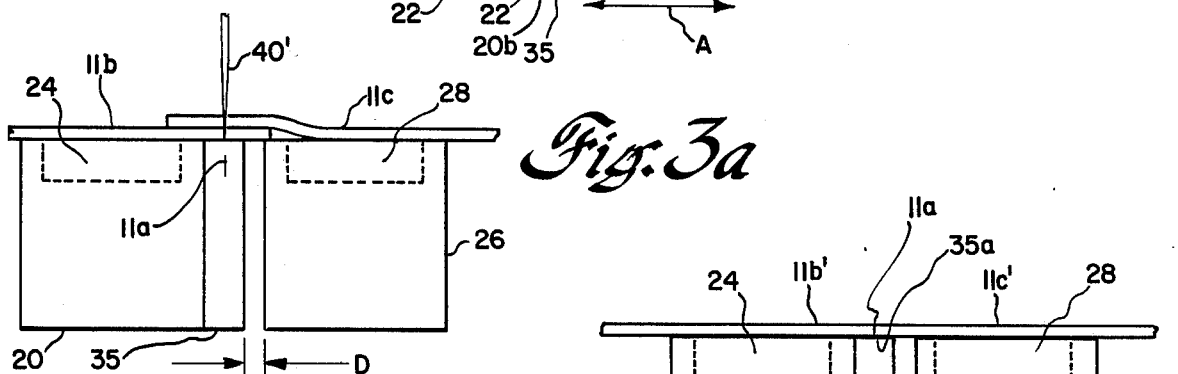
Fig. 3a
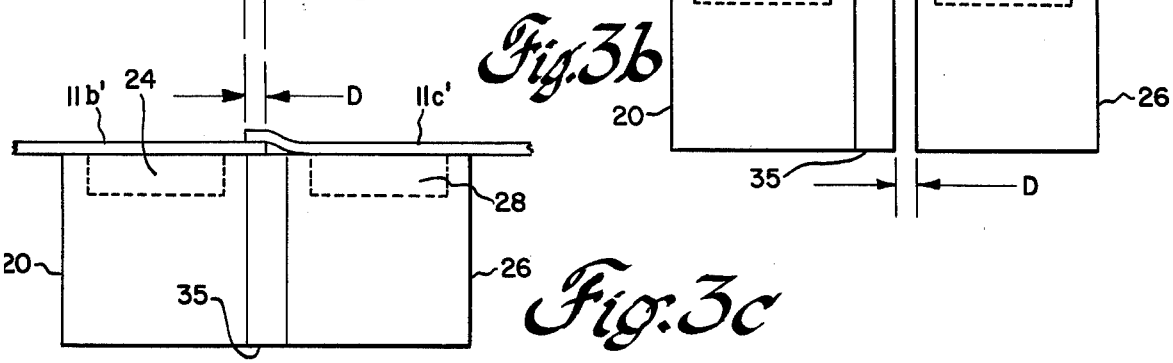
Fig. 3b
Fig. 3c

APPARATUS AND METHODS FOR FABRICATION OF MAGNETIC PRINTING BELT

BACKGROUND OF THE INVENTION

The present invention relates to magnetic printing media and, more particularly, to novel apparatus and methods for fabricating a continuous belt of magnetic material for use in a magnetic printer.

A magnetic printer of the type forming latent magnetic images on a belt of magnetizable material, typically requires that the magnetic belt form a continuous loop frequently having widths on the order of 20 to 30 inches. The belt, typically fabricated with a coating of a ferromagnetic oxide upon a supporting layer of a plastic material, such as Mylar$^{TM}$ and the like, requires that: the belt have the same loop circumference from one belt edge to the other, as a conical shape must be avoided to assure adequate tracking when the belt is run at high speed; that a bond of adequate strength be made at any splice occurring in the belt, typically having at least one splice where the tape has been drawn into itself to form the loop, to assure that sufficient tension can be applied to the belt to provide adequate contact between the belt material and a magnetic printing head over which the belt must pass for image formation; the tape surface be smooth at such a splice, whereby substantially no inking material is retained, in either mechanical or electrostatic manner, along the line of the splice; the thickness of the belt at the splice should not vary significantly from the thickness of the remainder of the belt, whereby little or no variation in spacing between confronting surfaces of the magnetic printing head and the magnetic belt is achieved, to assure uniformity of magnetic field penetration and, hence, of printing density; continuity of the magnetic surface of the belt must be maintained, to avoid either gaps or magnetic pick-up, for magnetized continuity; and, if the belt is to be tracked on the printer, suitable driving or tracking webs on the outermost edges of the fabricated group of magnetic belts may be added.

Methods and apparatus for forming continuous magnetic printing belts, having all of the above-described characteristics do not appear to be presently available.

BRIEF SUMMARY OF THE INVENTION

In accordance with the invention, apparatus for fabrication of a continuous loop of magnetic belt material comprises a pair of cylinders having their axes of rotation aligned essentially parallel to one another and spaced apart by a distance predeterminately selected to yield the desired loop circumference; stationary means, positioned between the cylinders, for temporarily fixedly holding a first end of a sheet of magnetic material; movable means, also positioned between the cylinders and movable with respect to the cylinders and to the stationary hold-down means, for holding another end of the sheet of magnetic materials; and means positioned adjacent the pair of hold-down means for cutting confronting edges of the material of the belt and for ultrasonically joining the abutting cut ends to form a splice of sufficient strength and substantially of the same thickness as the remainder of the belt, to complete the continuous loop.

In one preferred embodiment, the sealing means works against an anvil having a curved surface to facilitate the reduction of the overall thickness of the splice and decrease the damage to the area around such splice.

In other preferred embodiments, abrading means are utilized to form confronting edges of the magnetic belt material with complementary graded, rather than abrupt, edges, whereby the abraded edges may be overlapped and sealed.

Accordingly, it is one object of the present invention to provide novel apparatus for splicing a sheet of magnetic material into a continuous loop.

It is another object of the present invention to provide methods for forming continuous magnetic belt loops and splices therein having thicknesses substantially equal to the thickness through the loop material at points displaced from the region of the splice.

These and other objects of the present invention will become apparent upon consideration of the following detailed description taken in conjunction with the drawings.

BRIEF DESCRIPTION OF THE DRAWINGS

FIGS. 1 and 2 are respectively a perspective view and a side view of novel apparatus for forming a continuous loop of magnetic belt material;

FIGS. 3a-3d are side views of a portion of the apparatus of FIGS. 1 and 2, illustrating steps in the formation of one preferred belt splice;

DETAILED DESCRIPTION OF THE INVENTION

Figure 3D:
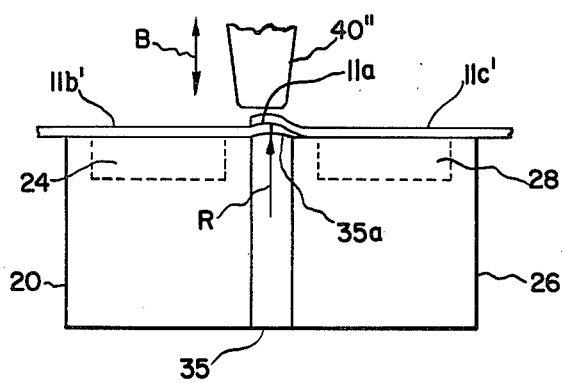

Referring initially to FIGS. 1 and 2, apparatus 10 for fabricating a continuous loop 11 of magnetic belt material is shown. Advantageously, the magnetic belt is formed from a magnetic tape having a two layer structure (see, for example, FIG. 4a) with a supporting layer 12 of a plastic resin, such as Mylar$^{TM}$ and the like, having a thickness on the order of 850 micro-inches, supporting a layer 13 of a ferromagnetic oxide material having a thickness on the order of 350-850 micro-inches. A length of this relatively thin tape is cut to a dimension slightly greater than the desired circumference of the finished loop; a splice, as at 11a, must be formed not only joining precisely complementary edges of the backing layer, to provide adequate support at the junction between the opposed edges, but also joining the ends of the magnetic layers, to prevent gaps in the magnetic material, and with a total splice thickness substantially equal to the thickness of the belt web at points displaced from the junction, to assure minimum variation in belt thickness. Apparatus 10 comprises a pair of cylinders 14a and 14b each having its axis of rotation 15a and 15b, respectively, maintained parallel to the other by means of a pair of substantially parallel spanning rods 17a and 17b having the ends thereof force fitted into radial recesses 18 in each of cylindrical members 14a and 14b. It should be understood that, while a prefered embodiment of apparatus 10 is shown with spanning rods of fixed length to assure essentially equal circumference of each of a plurality of belts fabricated on an individual apparatus, means may be included to increase or decrease the distance between the parallel axes of the cylindrical members to allow fabrication of each belt with a selected circumference of lesser or greater dimension. In such event, particular care must be taken to adjust the length of each spanning rod equally to assure that a line on the surface of one cylindrical member, parallel to the axis of rotation thereof, is parallel to any line on a surface of the other cylindrical member and parallel to the axis of rotation thereof, to assure that a conically-shaped loop is not fabricated, i.e. the circumference of a loop around cylinders 14a and 14b, from one edge of the magnetic belt material to the opposite edge does not deviate more than a preselected small value, e.g. ±0.001 inch, for a belt of width on the order of 20–30 inches.

A block 20 has a pair of apertures 21 formed therethrough to slidingly receive therein intermediate sections of spanning rods 17a and 17b. Means, such as set screws 22, are included in block 20 for fixedly mounting the block at a position along the length of the spanning rods between the cylindrical members. A chamber 24 is recessed into a top surface 20a of the block and is in fluid-flow connection with a hose means 25, coupled to a source of vacuum (not shown) to cause recessed chamber 24 to act as vacuum hold-down for a first end 11b of the sheet of belt material layed upon block surface 20a. Advantageously, the area of the open end of recess 24 is reduced by use of a plate 25 of fiber glass and the like, having a multiplicity of perforations 25a therethrough.

Another block 26 has a pair of apertures 27 formed therethrough to each slidingly receive one of spanning rods 17a and 17b and has a recessed chamber 28 formed into a top surface 26a thereof and covered with another apertured plate 25. Chamber 28 is in fluid-flow connection with another hose means 29 also coupled to the vacuum source. The remaining end 11c of the sheet of belt material is layed upon block surface 26a and held thereto by means of the vacuum hold-down formed by the vacuum induced in recessed chamber 28.

A micrometer assembly 30 is fastened between stationary block 20 and block 26 to allow the latter to be moved, in the directions of arrows A, with respect to the former, whereby the amount of overlap of belt ends 11b and 11c may be adjusted.

An elongated anvil member 35 is permanently fastened to that side 20b of the stationary block member facing the nearest side of movable block member 26. Means (not shown) are utilized for moving, in the directions of arrows B, an elongated tool assembly 40 perpendicular to the elongated dimensions of the spanning rods and anvil and into and out of contact with the region at which splice 11a is to be formed in the loop 11 of belt material.

Referring now to FIGS. 3a–3d, wherein like reference numerals are utilized for like elements, the required splice is formed in accordance with the following process steps: the first end 11b of the magnetic belt material is attached to stationary block 20 by means of the vacuum hold-down facilitated by the vacuum in recessed chamber 24 and the sheet of belt material is wrapped about half the circumference of cylindrical member 14a, thence positioned below the bottoms of blocks 20 and 26, wrapped about half the circumference of cylindrical member 14b and then stretched, with the extreme edge of end 11c overlapping first belt end 11b and the portion of the belt adjacent remaining end 11c being attached to block 26 by means of the vacuum hold-down facilitated by the vacuum in recessed chamber 28.

The spacing distance D between confronting faces of anvil 35 and movable block member 26 is adjusted to the value of a desired overlap dimension in the finished splice. An elongated knife-edge member 40' is utilized as tool 40 and is brought into contact with the associated surface of anvil member 35, to cut the overlapped ends 11b and 11c along the line of splice 11a (FIG. 3a).

Cutting tool 40' is withdrawn (FIG. 3b) to leave the opposed, cut ends 11b' and 11c', respectively, having a complementary edge along the line of splice 11a. The scrap tape is removed and the cut tape ends now lie in abutting relationship and flat upon the top surface 35a of the anvil member.

The micrometer mechanism is now adjusted to bring movable block 26 substantially into abutment with anvil member 35, whereby the belt material is pulled taut, while one cut end, e.g., 11c', is forced above and into overlapping relationship with remaining cut end, 11b'. The cut ends now overlap each other by the splice distance D.

An ultrasonic welding tool 40', preferably operating at an ultrasonic frequency on the order of 25 kHz., is now attached (FIG. 3b) to the tool support means in place of the knife edge member 40' of FIG. 3a. Ultrasonic tool 40" is configured for vibration in a direction, as shown by arrows B, perpendicular to the anvil top surface 35a. Ultrasonic tool 40" is moved into abutment with the overlapped tape ends 11b' and 11b ' and is pressed thereagainst while being traversed (in a direction into and out of the plane of the drawing) along the length of the line of splice 11a to seal a seam therealong between the cut belt ends.

We have found that a splice of suitable strength is achieved when the tape overlapped distance D is within the range of about 1 milli-inches to about 0.035 milli-inches with the ultrasonic tool exerting a pressure of between about 5 and about 30 pounds upon the seam region and with the ultrasonic tool traversing along the length of the splice at a speed of between about 1 and 6 inches per second. It should be understood, however, that other overlap distances, tool pressures and traversal speeds may be utilized as required by the particular material to be bonded. It should be further understood that the only requirements for the cylinders 14a and 14b is that the previously mentioned parallelism of lines (parallel to the respective axes of rotation) on the surface thereof and that the diameter of each cylindrical member be such that there is no mechanical interference between the bottom of the loop and the bottom surfaces of hold-down blocks 20 and 26, while allowing the tape ends to lie substantially flat upon the surfaces of the blocks when the vacuum hold-down mechanism is enabled.

Advantageously, the anvil surface 35a will not be flat but will have an upwardly-convex curvature wherein the surface is ground to a radius of curvature R of from about 1 inch to about 8 inches, with the circular anvil surface extending above the adjacent hold-down block surface 35a to press against the belt material to decrease both the overall thickness of the ultrasonically-welded splice along the line thereof and the area of damage around the overlapped splice line.

Figure 4A:
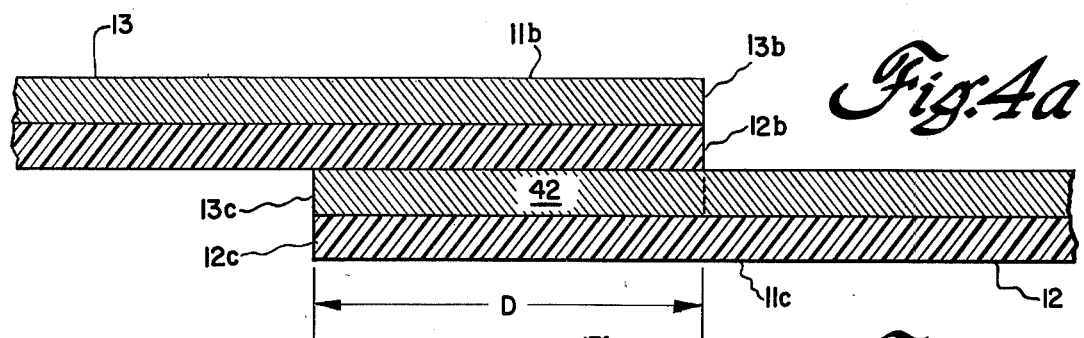
FIGS. 4a and 4b are side views illustrating the formation of another type of magnetic loop joint.
Figure 4B:
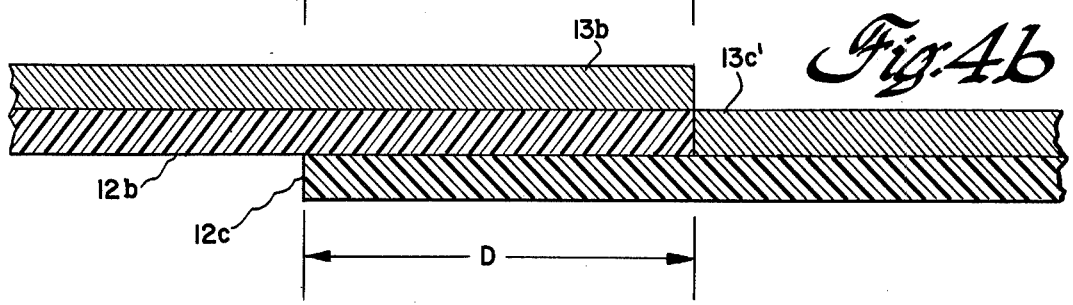

Referring now to FIGS. 4a and 4b, an alternative preferred splice is formed by overlapping the belt material end sections 11b and 11c, as previously described hereinabove with respect to FIGS. 3a and 3b, to overlap a desired distance D. We have found that a strong splice requires that a weld between these plastic resin backing layers 12b and 12c of respective belt material ends 11b and 11c. Hitherto, this would be accomplished by removing that portion 42 of the ferromagnetic oxide layer 13c of the underlying tape end 11c by utilizing additional power during the ultrasonic bonding step, previously described hereinabove, although this technique for "blasting away" the magnetic oxide from the bottom tape tends to damage the magnetic layer 13b of the uppermost tape end 11b. Therefore, the portion 42 of magnetic oxide layer 13c is removed (FIG. 4b) by scraping or grinding off that layer along a strip of width D adjacent to the cut belt end 11c. Thus, the ends 12b and 12c of the plastic resin backing layer are layed one atop the other and an ultrasonic bond is formed therebetween. The bond so formed requires relatively less power for the formation thereof, with respect to the configuration of FIG. 4a, and reduces subsequent damage to the oxide layer 13b of the uppermost tape end 11b. Advantageously, a small portion of the backing layer of either end may be removed to not only decrease the overall thickness of the welded splice but to cause magnetic layers 13b and 13c' to move into abutment with each other and thereby minimize the break in the magnetic surface. It should be understood that the removed portion 42 of the magnetic oxide layer 13c of the bottom, overlapped (and the removed Mylar portion if utilized) may be carried out by replacing the elongated cutting blade 40' with a suitable scraping or grinding tool prior to the replacement of the tool with the ultrasonic bonding tool 40".

Figure 5:
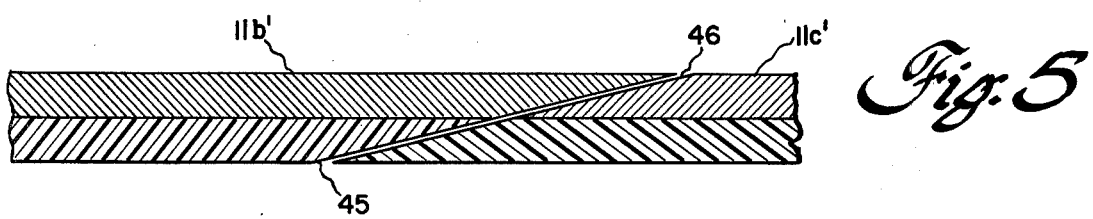
FIG. 5 is a side view illustrating the formation of a third type of preferred joint for forming a loop of magnetic bulk material.

Referring now to FIG. 5, a third preferred embodiment of splice for forming the continuous loop of magnetic belt material is facilitated by increasing the separation distance between hold-down blocks 20 and 26 after performing the cutting step hereinabove described with reference to FIG. 3b, and then replacing the tool 40 with a suitable abrading or grinding means capable of abrading each tape end 11b' and 11c' with a suitable graded surface 45 and 46, respectively, having complementary surfaces each to the other. The distance between tape ends is decreased until the undercut portion 45 of first belt end 11b' slides over the complementary overcut portion 46 of tape end 11c' and the graded splice is formed utilizing ultrasonic bonding tool 40", as in FIG. 3d.

It should be understood that the completed splice, along splice line 11a, may require suitable scraping, grinding or sanding of the upper surface of the ferromagnetic oxide layer 13 thereat to remove any broken surface features and prevent mechanical or magnetic pick-up of inking material along the splice line. Similarly, applying a coating along the splice line with magnetic pigment slurries or non-magnetic slurries, such as electro DAG 154 (available from the Acheson Corp.) may be used either in conjunction with or separately from surface conditioning of the completed splice to reduce mechanical and magnetic inking material pickup. Advantageously, the use of a magnetic pigment coat reduces printing "drop-out" by replacing magnetic material in any voids formed during the splicing process.

Figure 6A:
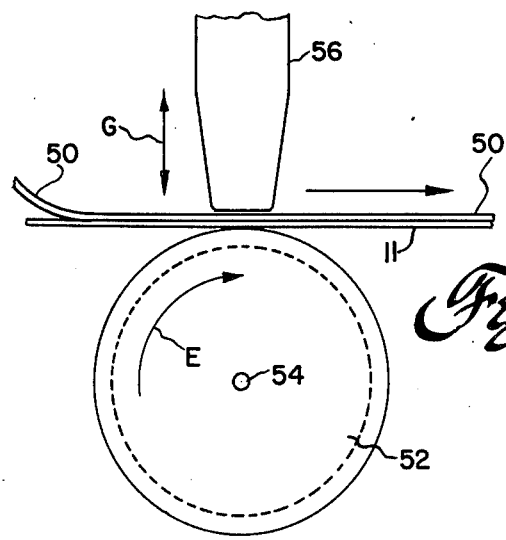
FIG. 6a and 6b are respectively side and end views of apparatus for fabricating a tracking web on the outside edge of an assembled belt loop.
Figure 6B:
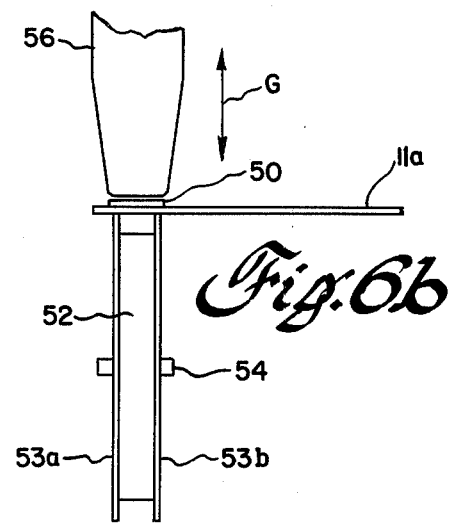

Referring now to FIGS. 6a and 6b, the continuous loop 10 formed by splicing together the ends of a sheet of magnetic material, may advantageously have a track member attached to the outside circumference of the belt edges, as required for tracking or driving the tape loop for improving the tensile strength at the edges of the loop or for timing the position of the splice. Each track member 50, typically of the pair thereof, is joined to the exterior surface of the belt loop at an edge thereof by means of a suitable adhesive or by ultrasonic bonding.

For ultrasonic bonding, the loop is mounted over a wheel 52, having a generally "U"-shaped rim 53 thereon, and which is caused to rotate in a direction of arrow E about a pivot means 54. The rim may be fabricated by fixedly fastening a pair of disks 53a and 53b to opposite sides of wheel 52, with each of disks 53 having a greater diameter than the diameter of the wheel. As wheel 52 rotates in the direction of arrow E, the loop 11 of belt material is caused to travel in the direction of arrow F, whereby each track member strip 50 may be positioned upon belt surface 11 and move therewith past an ultrasonic bonding tool 56. Tool 56 is movable in the direction of arrows G, to bear against the "sandwich" of the magnetic tape and the track member, which is advantageously formed of a plastic resin material, such as Mylar TM and the like. The sandwich is bonded together by means of the ultrasonic motion and pressure of tool 56. If desired, each of track members 15 may be fabricated of a suitable metallic material and adhesively applied to belt loop surface 11, with wheel member 52 and tool member 56 being utilized to supply a suitable pressure to cause the proper adhesive bond to form between the belt loop and the track member.

While several preferred embodiments of the present invention have been described, many variations and modifications will now become apparent to those skilled in the art. It is our intent, therefore, to be limited not by the specific embodiments disclosed herein, but only by the scope of the appending claims.

What is claimed is:

1. Apparatus for fabrication of a continuous loop from a sheet of material, comprising:

first and second cylindrical members;

means for rigidly positioning said first and second cylindrical members in spaced-apart relationship with their axes of rotation essentially parallel each to the other;

an anvil member having a top surface;

first means fixedly positioned between said cylindrical members for holding a first end of said sheet of material, said first means having a surface to which said anvil member is attached with said anvil member top surface underlying and supporting said first sheet end;

second means positioned between said cylindrical members for holding a remaining end of said sheet of material after said sheet has been passed from said first means and about opposing circumferential half-surfaces of said cylindrical members;

means coupled to said first and second means for varying the distance between said anvil member and said second means to adjust the amount of overlap of said first and remaining ends of said sheet; and means positioned adjacent to said anvil member for cutting the overlapped edges along a line of splice and for joining the adjacent cut ends to form a splice therebetween.

2. Apparatus as set forth in claim 1, wherein said anvil top surface is curved convexly toward said material positioned thereon.

3. Apparatus as set forth in claim 1, wherein said curved top surface has a radius of curvature between about 1 inches and about 8 inches.

4. Apparatus as set forth in claim 1, further comprising means adjacent said first and second means for abrading the cut ends of said material sheet to form complementary graded confronting edges.

5. Apparatus as set forth in claim 1, wherein said first and second means are each a block member having a first surface with a recess formed therein, each said block member being positioned to cause an associated end of said material sheet to overlay said recess; and means for forming a vacuum within said recess to urge the associated material sheet end towards said recess and against the associated block first surface.

6. Apparatus as set forth in claim 1, wherein said means for maintaining said cylindrical member in spaced apart relationship comprises a plurality of elongated rigid members each having respective first and second ends respectively at least temporarily fixedly fastened to different ones of said cylindrical members.

* * * * *